US006863280B2

(12) United States Patent
Chiu

(10) Patent No.: US 6,863,280 B2
(45) Date of Patent: Mar. 8, 2005

(54) TOOL FIXING STRUCTURE

(76) Inventor: Li Jiun Chiu, No. 56, Nangang Rd., Guoshing Shiang, Nantou (TW), 544

( * ) Notice: Subject to any disclaimer, the term of this patent is extended or adjusted under 35 U.S.C. 154(b) by 152 days.

(21) Appl. No.: 10/303,116

(22) Filed: Nov. 20, 2002

(65) Prior Publication Data

US 2004/0094909 A1 May 20, 2004

(51) Int. Cl.[7] .................................... B23B 31/10
(52) U.S. Cl. .......................... 279/82; 279/23.1; 279/79
(58) Field of Search .......................... 279/23.1, 29, 79, 279/80, 82, 906

(56) References Cited

U.S. PATENT DOCUMENTS 632,560 A * 9/1899 Furbish ...................... 279/82
1,138,465 A * 5/1915 Fegley et al. ................ 279/82
1,209,572 A * 12/1916 Fegley ....................... 279/82
1,653,762 A * 12/1927 Fegley et al. ................ 279/82
4,629,375 A * 12/1986 Lieser .................... 408/239 R
4,692,073 A * 9/1987 Martindell .............. 408/239 A
4,701,083 A * 10/1987 Deutschenbaur et al. ... 408/240
5,709,393 A * 1/1998 von Keudell et al. ......... 279/97
6,053,675 A * 4/2000 Holland et al. ......... 408/239 R
6,474,656 B1 * 11/2002 Thomas ....................... 279/30
2003/0230862 A1 * 12/2003 Peters et al. .................. 279/82

* cited by examiner

*Primary Examiner*—Daniel W. Howell
(74) *Attorney, Agent, or Firm*—Charles E. Baxley

(57) ABSTRACT

A tool fixing structure includes a snap ring, a fixing socket, an elastic member, a fixing rod, an outer socket, and a pressing socket. In such a manner, the screwdriver head is mounted on and detached from the tool fixing structure rapidly, easily and conveniently, thereby facilitating replacement of the screwdriver head, and thereby facilitating the user operating the screwdriver head. In addition, the pressing socket is modularized, and may be replaced according to the requirements, thereby enhancing the versatility of the tool fixing structure. Further, the snap ring, the outer socket and the pressing socket are made of an aluminum material, thereby decreasing the weight of the tool fixing structure.

7 Claims, 4 Drawing Sheets

TOOL FIXING STRUCTURE

BACKGROUND OF THE INVENTION

1. Field of the Invention

The present invention relates to a tool fixing structure, and more particularly to a tool fixing structure, wherein the screwdriver head is mounted on and detached from the tool fixing structure rapidly, easily and conveniently, thereby facilitating replacement of the screwdriver head, and thereby facilitating the user operating the screwdriver head.

2. Description of the Related Art

A conventional tool fixing structure has a bottom end fixed in the chuck of a motorized tool, and a screwdriver head is inserted into the top end of the tool fixing structure. In such a manner, the bottom end of the tool fixing structure is combined with the motorized tool, and the top end of the tool fixing structure is combined with the screwdriver head, so that when the motorized tool is rotated, the tool fixing structure is rotated so as to rotate the screwdriver head synchronously. However, the conventional tool fixing structure has a complicated structure, thereby increasing the cost of fabrication. In addition, the screwdriver head cannot be mounted on and detached from the tool fixing structure rapidly, easily and conveniently, thereby causing inconvenience in replacement of the screwdriver head, and thereby causing inconvenience to the user when operating the screwdriver head.

SUMMARY OF THE INVENTION

The present invention has arisen to mitigate and/or obviate the disadvantage of the conventional tool fixing structure.

The primary objective of the present invention is to provide a tool fixing structure, wherein the screwdriver head is mounted on and detached from the tool fixing structure rapidly, easily and conveniently, thereby facilitating replacement of the screwdriver head, and thereby facilitating the user operating the screwdriver head.

Another objective of the present invention is to provide a tool fixing structure, wherein the pressing socket is modularized, and may be replaced according to the requirements, thereby enhancing the versatility of the tool fixing structure.

A further objective of the present invention is to provide a tool fixing structure, wherein the snap ring, the outer socket and the pressing socket are made of an aluminum material, thereby decreasing the weight of the tool fixing structure.

In accordance with the present invention, there is provided a tool fixing structure, comprising a snap ring, a fixing socket, an elastic member, a fixing rod, an outer socket, and a pressing socket, wherein:

the fixing rod has a top end face formed with an insertion hole for insertion of a screwdriver head;

the elastic member is mounted on the fixing rod, the fixing socket is mounted on the fixing rod, and has a top end urged on the bottom end of the elastic member;

the snap ring is mounted on the fixing socket;

the outer socket is mounted on the fixing rod, with the elastic member being received in the outer socket, the outer socket has a first end mounted on the snap ring, with the snap ring be sandwiched between the first end of the outer socket and the fixing socket; and the pressing socket is mounted on the second of the outer socket, and has an inner wall formed with an annular protruding face urged on the top end of the elastic member.

Further benefits and advantages of the present invention will become apparent after a careful reading of the detailed description with appropriate reference to the accompanying drawings.

DETAILED DESCRIPTION OF THE INVENTION

Figures 1, 3:
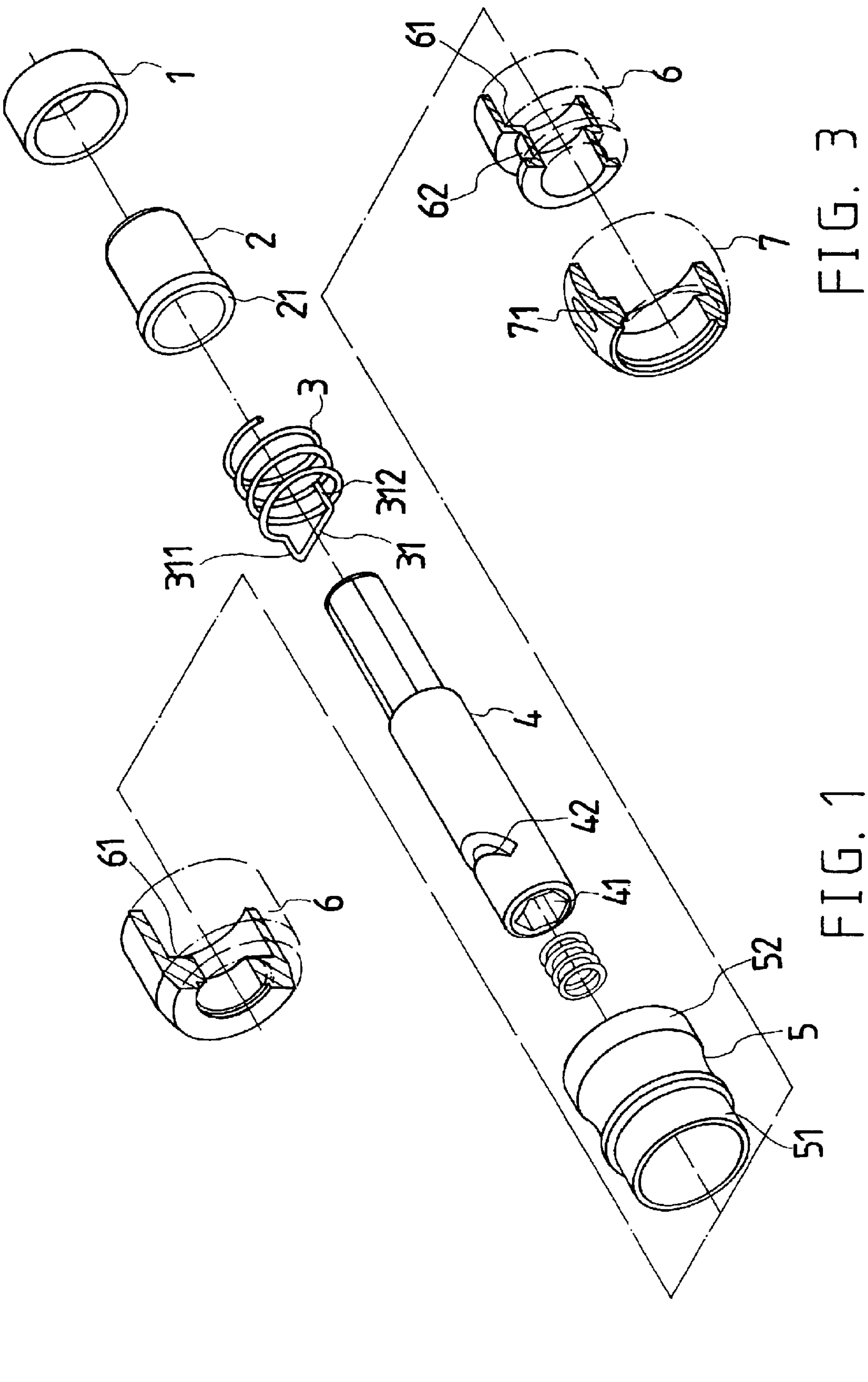
FIG. 1 is an exploded perspective view of a tool fixing structure in accordance with a first embodiment of the present invention.
FIG. 3 is a perspective view of a pressing socket and an anti-skid sleeve of a tool fixing structure in accordance with a second embodiment of the present invention.
Figure 2:
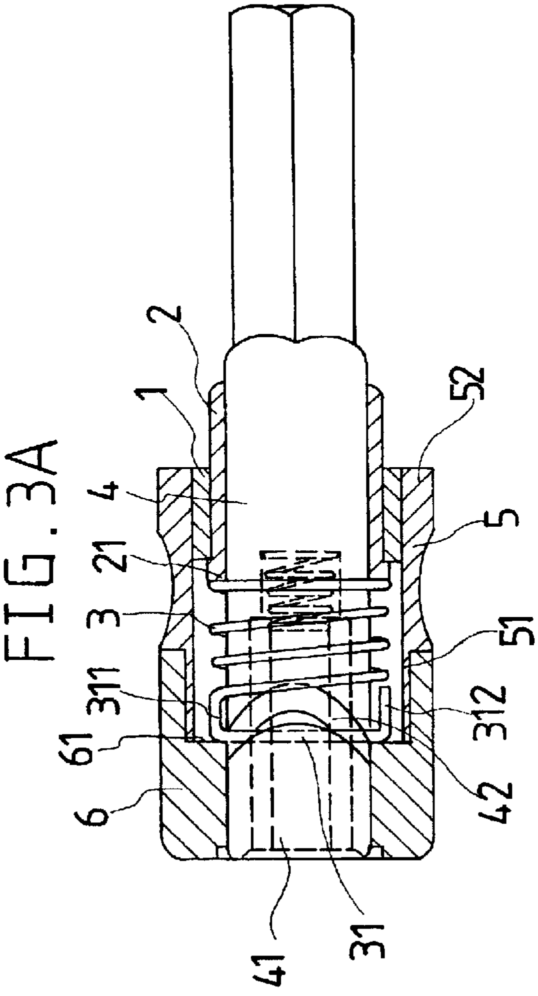
FIG. 2 is a top plan cross-sectional assembly view of the tool fixing structure as shown in FIG. 1.

Referring to the drawings and initially to FIGS. 1 and 2, a tool fixing structure in accordance with a first embodiment of the present invention comprises a snap ring 1, a fixing socket 2, an elastic member 3, a fixing rod 4, an outer socket 5, and a pressing socket 6.

The snap ring 1 is a hollow body. The snap ring 1 is preferably made of an aluminum material.

The fixing socket 2 is a hollow body, and has a top end formed with a flange 21.

The elastic member 3 is a helical spring, and has a top end formed with a resting portion 31 which has a first side 311 and a second side 312.

The fixing rod 4 has a top end face formed with a hexagonal insertion hole 41. The fixing rod 4 has a periphery formed with a retaining slot 42 communicating with the insertion hole 41.

The outer socket 5 is a hollow body, and has a top end formed with a top edge 51 and a bottom end formed with a bottom edge 52. The outer socket 5 is preferably made of an aluminum material.

The pressing socket 6 is a hollow body, and has an inner wall formed with an annular protruding face 61. The pressing socket 6 is preferably made of an aluminum material.

In assembly, the elastic member 3 is mounted on the fixing rod 4, and the resting portion 31 of the elastic member 3 is fixed in the retaining slot 42 of the fixing rod 4. The width of the resting portion 31 of the elastic member 3 is greater than that of the retaining slot 42 of the fixing rod 4, so that the first side 311 and the second side 312 of the resting portion 31 of the elastic member 3 are protruded outward from the two sides of the retaining slot 42 of the fixing rod 4. Then, the fixing socket 2 is mounted on the fixing rod 4, and the flange 21 of the fixing rod 4 is urged on the bottom end of the elastic member 3. Then, the snap ring 1 is mounted on the fixing socket 2, and is rested on the flange 21 of the fixing rod 4. Then, the outer socket 5 is mounted on the fixing rod 4, with the elastic member 3 being received in the outer socket 5. At this time, the bottom edge 52 of the outer socket 5 is mounted on the snap ring 1, with the snap ring 1 be sandwiched between the bottom edge 52 of the outer socket 5 and the fixing socket 2. Then, the pressing socket 6 is mounted on the top edge 51 of the outer socket 5, and the annular protruding face 61 of the pressing socket 6 is urged on the first side 311 and the second side 312 of the resting portion 31 of the elastic member 3 protruding outward from the two sides of the retaining slot 42 of the fixing rod 4.

Thus, the tool fixing structure in accordance with the first embodiment of the present invention is assembled.

Figure 3A:
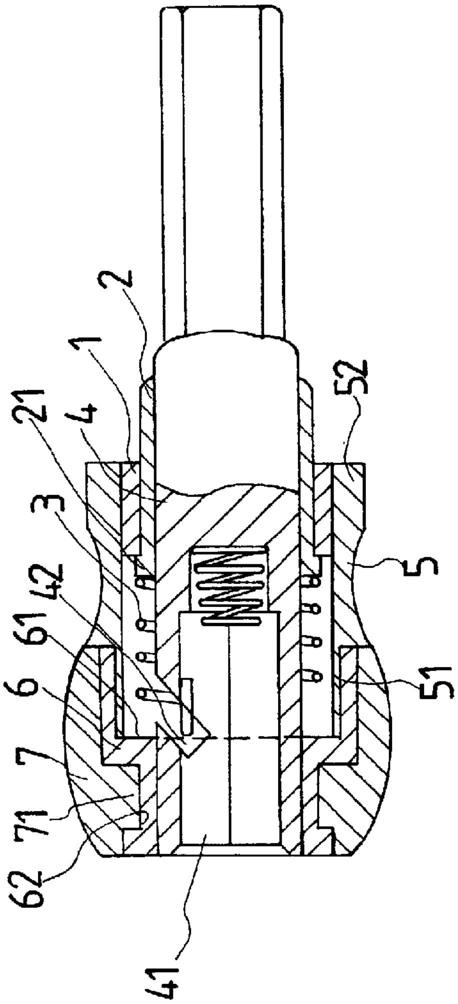
FIG. 3A is a top plan cross-sectional assembly view of the tool fixing structure in accordance with the second embodiment of the present invention.

Referring to FIGS. 3 and 3A, a tool fixing structure in accordance with a second embodiment of the present invention is shown, wherein the pressing socket 6 has an outer wall formed with an annular groove 62.

The tool fixing structure in accordance with the second embodiment of the present invention further comprises an anti-skid sleeve 71 mounted on the outer wall of the pressing socket 6. The anti-skid sleeve 71 is made of a rubber material, and has an inner wall formed with a locking rib 71 that is locked in the annular groove 62 of the pressing socket 6, so that the anti-skid sleeve 71 is fixed on the outer wall of the pressing socket 6 without detachment.

Figure 4:
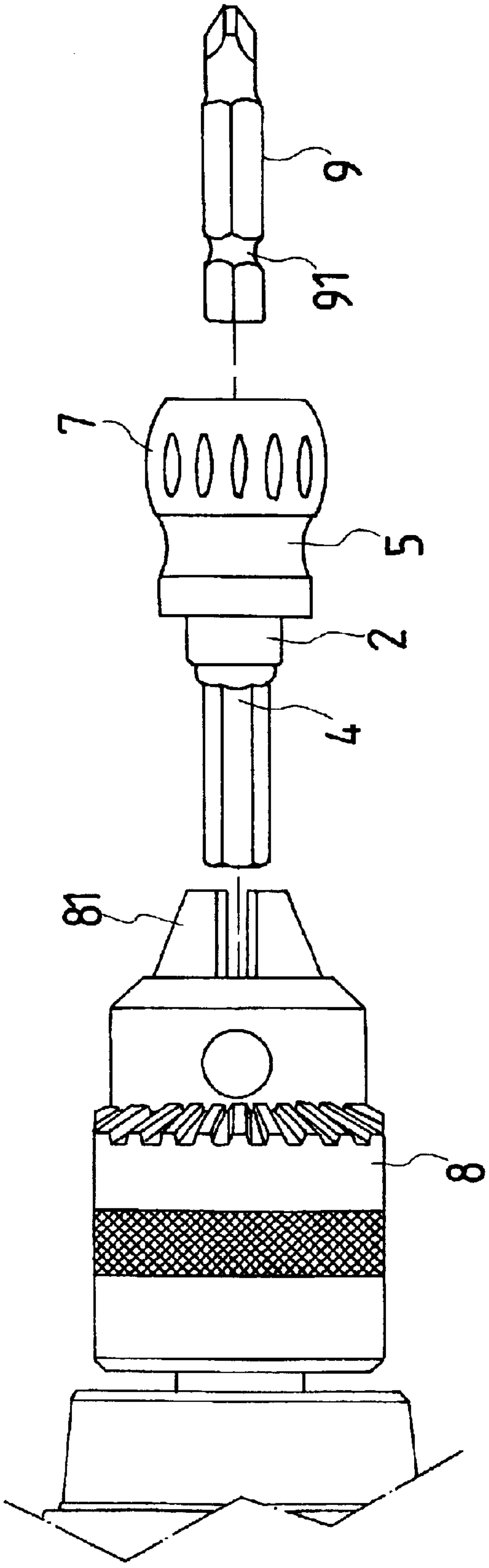
FIG. 4 is a schematic plan view showing the tool fixing structure being combined with a motorized tool and a screwdriver head.

In operation, referring to FIG. 4, the bottom end of the fixing rod 4 is fixed in the chuck 81 of a motorized tool 8, and a screwdriver head 9 is inserted into the insertion hole 41 of the fixing rod 4. The screwdriver head 9 has an outer wall formed with an annular positioning groove 91.

Figure 5:
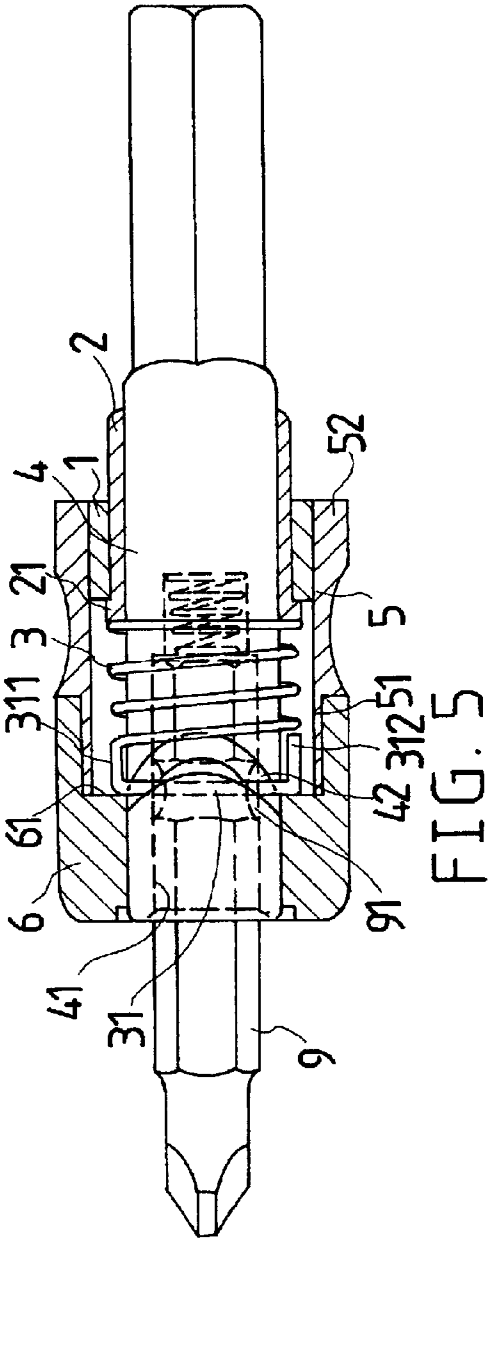
FIG. 5 is a schematic plan cross-sectional assembly view showing the tool fixing structure being combined with the screwdriver head.

Referring to FIG. 5, the retaining slot 42 of the fixing rod 4 communicates with the insertion hole 41 of the fixing rod 4. Thus, when the screwdriver head 9 is inserted into the insertion hole 41 of the fixing rod 4, the bottom end of the screwdriver head 9 presses the resting portion 31 of the elastic member 3 to move downward through a distance. At this time, the resting portion 31 of the elastic member 3 is still retained in the retaining slot 42 of the fixing rod 4, so that the screwdriver head 9 is moved successively. Thus, when the screwdriver head 9 is moved to the position where the annular positioning groove 91 of the screwdriver head 9 aligns with the resting portion 31 of the elastic member 3, the resting portion 31 of the elastic member 3 is sprung inward and is locked in the annular positioning groove 91 of the screwdriver head 9, so that the screwdriver head 9 is fixed in the insertion hole 41 of the fixing rod 4 without detachment.

In such a manner, the bottom end of the fixing rod 4 is combined with the motorized tool 8, and the top end of the fixing rod 4 is combined with the screwdriver head 9, so that when the motorized tool 8 is rotated, the fixing rod 4 is rotated so as to rotate the screwdriver head 9 synchronously.

Figure 6:
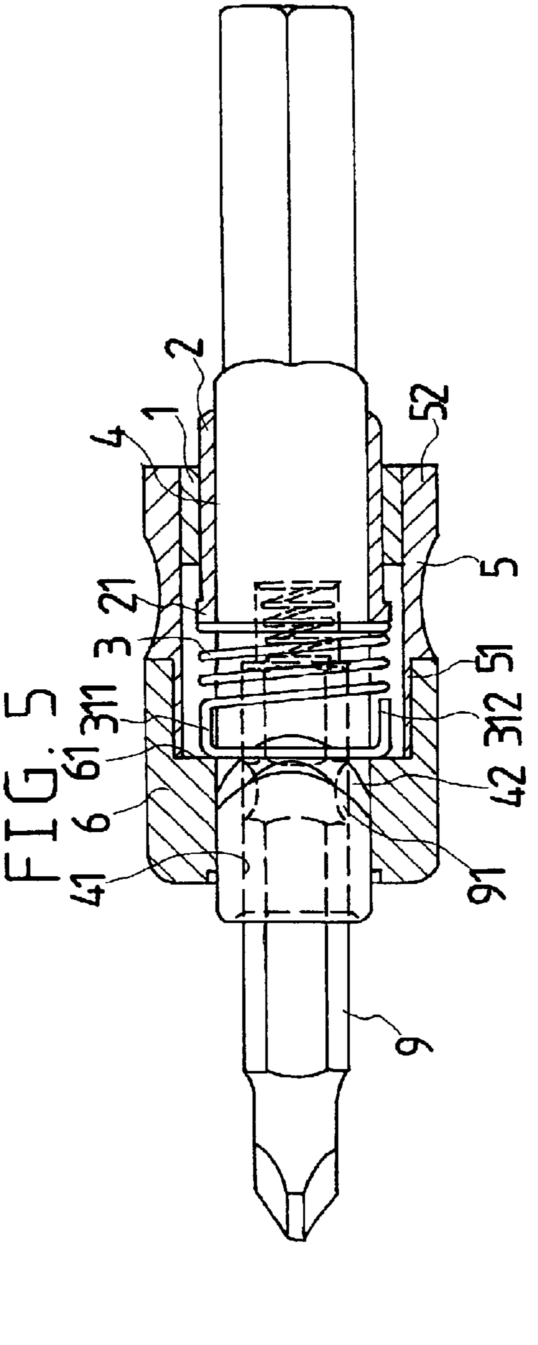
FIG. 6 is a schematic operational view of the tool fixing structure as shown in FIG. 5.

Referring to FIG. 6, when the user wishes to detach the screwdriver head 9, he only needs to press the pressing socket 6 to move downward. The annular protruding face 61 of the pressing socket 6 is urged on the first side 311 and the second side 312 of the resting portion 31 of the elastic member 3. Thus, when the pressing socket 6 is moved downward, the resting portion 31 of the elastic member 3 is also pressed to move downward, thereby compressing the elastic member 3. At this time, the resting portion 31 of the elastic member 3 is moved to detach from the annular positioning groove 91 of the screwdriver head 9, so that the screwdriver head 9 is detached from the insertion hole 41 of the fixing rod 4. After the pressing force applied on the pressing socket 6 is removed, the pressing socket 6 and the resting portion 31 of the elastic member 3 are returned to the original position by the restoring force of the elastic member 3.

Accordingly, the screwdriver head 9 is mounted on and detached from the tool fixing structure rapidly, easily and conveniently, thereby facilitating replacement of the screwdriver head 9, and thereby facilitating the user operating the screwdriver head 9. In addition, the pressing socket 6 is modularized, and may be replaced according to the requirements, thereby enhancing the versatility of the tool fixing structure. Further, the snap ring 1, the outer socket 5 and the pressing socket 6 are made of an aluminum material, thereby decreasing the weight of the tool fixing structure.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. A tool fixing structure, comprising a snap ring, a fixing socket, an elastic member, a fixing rod, an outer socket, and a pressing socket, wherein:

the fixing rod has a top end face formed with an insertion hole for insertion of a screwdriver head;

the elastic member is mounted on the fixing rod, the fixing socket is mounted on the fixing rod, and has a top end urged on the bottom end of the elastic member;

the snap ring is mounted on the fixing socket;

the outer socket is mounted on the fixing rod, with the elastic member being received in the outer socket, the outer socket has a first end mounted on the snap ring, with the snap ring sandwiched between the first end of the outer socket and the fixing socket; and the pressing socket is mounted on a second end of the outer socket, and has an inner wall formed with an annular protruding face urged on the top end of the elastic member.

2. The tool fixing structure according to claim 1, wherein the fixing rod has a periphery formed with a retaining slot communicating with the insertion hole, and the top end of the elastic member is formed with a resting portion retained in the retaining slot of the fixing rod.

3. The tool fixing structure according to claim 2, wherein the resting portion of the elastic member has two sides protruded outward from the two sides of the retaining slot of the fixing rod.

4. The tool fixing structure according to claim 1, wherein the top end of the fixing socket is formed with a flange rested on the bottom end of the elastic member.

5. The tool fixing structure according to claim 1, further comprising an anti-skid sleeve mounted on the outer wall of the pressing socket.

6. The tool fixing structure according to claim 5, wherein the pressing socket has an outer wall formed with an annular groove, and the anti-skid sleeve has an inner wall formed with a locking rib that is locked in the annular groove of the pressing socket, so that the anti-skid sleeve is fixed on the outer wall of the pressing socket without detachment.

7. The tool fixing structure according to claim 1, wherein the snap ring, the outer socket and the pressing socket are made of aluminum material.

* * * * *